US012262297B2

(12) United States Patent
Brooks et al.

(10) Patent No.: US 12,262,297 B2
(45) Date of Patent: Mar. 25, 2025

(54) DECENTRALIZED EMERGENCY RESPONSE BY FRIENDS AND FAMILY

(71) Applicant: SEMCOREL INC., San Jose, CA (US)

(72) Inventors: David Andrew Brooks, San Jose, CA (US); Davis Zhu, Fremont, CA (US)

(*) Notice: Subject to any disclaimer, the term of this patent is extended or adjusted under 35 U.S.C. 154(b) by 0 days.

(21) Appl. No.: 18/515,223

(22) Filed: Nov. 20, 2023

(65) Prior Publication Data

US 2024/0089718 A1    Mar. 14, 2024

Related U.S. Application Data

(63) Continuation of application No. 16/416,191, filed on May 18, 2019.

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ................. H04W 4/90; H04W 4/029
USPC ........................................... 455/404
See application file for complete search history.

(56) References Cited

U.S. PATENT DOCUMENTS

| 10,649,421 B2* | 5/2020 | Nelmes ................. G05B 15/02 |
| 2010/0081411 A1* | 4/2010 | Montenero ........ G01N 33/0075 455/404.2 |

* cited by examiner

*Primary Examiner* — Ted M Wang
(74) *Attorney, Agent, or Firm* — Helen Mao; Imperium Patent Works

(57) ABSTRACT

A Method and System for coordinating help to an individual experiencing a medical emergency from their designated Emergency Care Team (ECT). The location of the Person in Distress (PID) and all of their emergency contacts is determined. A real time audio video conference is created which enables the PID and all members of the ECT to communicate. Real time vital signs from the PID's wearable health monitor is streamed to all participants. The PID's medical history is temporarily unlocked and provided on demand to the ECT members. The ECT members participate as available with no single person or call center coordinating this effort. Additional participants may be added to the conference at the discretion of the ECT members including, but not limited to the E911 operator for the PID's locale, the PID's medical providers, other individuals from the PID's contact list, or other individuals as may be deemed important to the response. Additional participants are provided with a mechanism which connects them into conference with full access to all the information available to the ECT members with no prior registration or App install.

6 Claims, 3 Drawing Sheets

DECENTRALIZED EMERGENCY RESPONSE BY FRIENDS AND FAMILY

CROSS REFERENCE TO RELATED APPLICATIONS

This application is a continuation, and claims priority under 35 U.S.C. § 120 from nonprovisional U.S. patent application Ser. No. 16/416,191, entitled "DECENTRALIZED EMERGENCY RESPONSE BY FRIENDS AND FAMILY", filed on May 18, 2019, the subject matter of which is incorporated herein by reference.

BACKGROUND ART

Most of the prior art to date has focused on the method used for the detection of a fall or an emergency, the architecture of a system for locating the person with the issue, and the communication channels used to connect the person to a central monitoring station. All of these prior filings assume a central monitoring service as part of the system. The cost of manning this central monitoring center with qualified personnel is prohibitive and is passed along to the subscribers One challenge with commercial Medical Alert or Personal Emergency Response Systems (PERS) is the lack of accuracy of the Fall Detection technology and Vital Signs interpretation. Current systems are prone to false positives, declaring an alert when no emergency exists. Recent implementations have included a Cancel button with timeout to minimize these, but the central monitoring system also acts as a buffer to prevent Public Safety Answering Point personnel from being called for a false alarm. The present invention eliminates the need for a central monitoring service by notifying a predetermined collection of friends, neighbors, and family members that act as the first responders and to make the determination if Emergency Medical Technicians are required.

U.S. Pat. No. 7,212,111 granted to Amy M. Tupler et al May 1, 2007 provides for the notification of an emergency contact list in case of emergency with verification that at least one emergency contact received the notification. This solution includes the notion of a processing center, which is defined as "a wireless communication provider, a separate and/or independent entity providing emergency dispatching services or other entity." The present invention eliminates the need for a processing center and instead replaces it with a distributed team of friends and family members which are notified directly by the system when an emergency is detected.

U.S. Pat. No. 6,333,694 B2 (Dec. 25, 2001) "Personal Emergency Response System" and U.S. Pat. No. 6,166,639 (Dec. 26, 2000) "Personal Emergency Response System" explains how the number of seniors living alone has increased the need for a system to provide assistance in case of an emergency. This patent builds upon U.S. Pat. No. 4,829,285 "In-home Emergency Assist Device" granted in 1989 and expired in 2007. The PERS patent improves upon previous art by providing video communication between the wearer and the personnel monitoring the wearer. It also provides for a Geofencing capability to determine when the wearer has moved outside a predetermined safety area. It further highlights the need to alert the monitoring personnel when the user is not wearing the alarm.

The PERS patents are focused on how to detect the emergency. Some are based on a wearer being in a predetermined position which is indicative of an emergency. Some are concerned with G forces. In the present market, Apple Watch, Fitbit and numerous other wearable consumer devices are equipped with more sophisticated fall detection capability than existed at the time of the PERS patent applications. We expect even further improvements in this technology in the near future with further commoditization of this function. The present invention seeks to take advantage of the increasing number of choices in the market for wearable health and safety monitors to focus on the coordination of the response team to validate the need and call for appropriate response.

In addition, with the commercialization of GPS capabilities in mobile phones and wearable devices like smart watches, the distance calculation method cited in these patents is no longer relevant. In fact, distance from a fixed point is severely limiting. Seniors often go to Church or to the grocery store as a part of their normal routine. So movement within their normal patterns is not alarm worthy. A more sophisticated system is required to determine abnormal behavior and potential alarm conditions.

U.S. Pat. No. 8,116,724 granted to Steven R. Peabody Feb. 14, 2012 is another example of a system with a central monitoring station. This patent is also notable for its comprehensive documentation of prior art for the PERS market.

Each of the above disclosures and the patents they include is incorporated herein by reference.

SUMMARY OF THE INVENTION

A health and safety monitoring system consisting of a combination of wearable devices and/or stationary wireless monitoring devices is used to detect medical emergencies or falls. Upon detecting a possible emergency, the system checks with the Person In Distress (PID) through either a Graphical UI or through a Voice User Interface to determine if an emergency exists. If the PID indicates a false alarm, the system notes this and learns from the mistake. If the PID confirms the Emergency condition, they have a choice of directly notifying E911 services directly or their Emergency Care Team (ECT). If the PID chooses their ECT, or if they fail to respond within a predetermined time limit, the system notifies all members of the ECT in parallel and establishes a real time emergency collaboration group. E911 service is not notified unless the PID or one of the ECT members makes the decision to call.

The ECT members are potentially geographically dispersed. Some members may be in proximity to the PID but others may be relatives located thousands of miles away. As each member of the ECT accepts the call, they are connected in an audio video conference which enables them to communicate with one another. The PID's endpoint device will also open the mic and speaker and connects that device into the conference. If the PID's wearable monitor has a mic, it will be enabled and connected into the conference as well. This enables the ECT members to communicate with the PID if conscious and able to speak. In some embodiments, other fixed devices may be present in the PID's home which may be opened as a communication channel. One example of this is a smart speaker which is exemplified by but not limited to an Amazon Echo device.

The ECT members are not just names and numbers provided by the PID, but are required to accept an invitation to become a ECT member and Opt In to share their location using the location capability of their user endpoint device during the emergency event. In the most common embodiment, the user endpoint device will be the ECT members' smartphone and the location capability is the embedded GPS. In other embodiments, the endpoint device can be a tablet, laptop, or smart speaker, and the location may be determined from their WiFi network. In yet other embodiments, the user endpoint device could be an embedded computer and screen in a moving vehicle, such as a car or truck.

The system also provides a mechanism to designate one or more ECT members as holding Medical Power of Attorney for the PID such that they can provide permission as needed to Medical Care Providers.

Each member of the ECT is required to register as a user and opt in to participate in the ECT. In one embodiment, the user installs an app on their smartphone. In another embodiment, the user participates through a browser on a tablet or laptop. The system described provides a graphical user interface which displays the following information during the emergency event:

A map showing the location of the PID and all other members of the ECT,

A status for each member of the ECT such as, but not limited to "on the call", "not responded", "en route" to the site of the emergency, A relationship for each ECT member including their status of Medical Power of Attorney, A display showing the vital signs of the PID, Access to the Medical Record of the PID including the past 24 hours of vital signs monitoring, A graphical button or voice command which enables any member of the ECT to initiate a call to E911 services for the location of the PID, even if the PID is not at home.

A user interaction element which enables an ECT member to invite other participants to join the emergency call with full access to the same information and features described above.

A voice only experience is provided for those users who are driving, without access to a display, or in the case of the PID, unable to move.

In a typical scenario, the ECT members will speak with the PID and determine if E911 is necessary. At the same time, the proximal ECT member(s) will travel to the PID location to provide help. Many accidents that require medical attention are not critical if attended to in a timely manner. The proximal ECT member may be able to resolve the situation with no further assistance or may provide transportation to an urgent care facility to resolve the situation. Given the high cost of EMT services, seniors on fixed incomes would prefer to seek care in a cost effective manner.

Members of the ECT will typically have installed an App on their smartphones in order to participate. However, the members added to the call will not necessarily have installed the App. One embodiment of this invention includes the ability to add new members through the use of a web link which is sent to their mobile via SMS. This link when accepted will connect them in to a virtual web conference where they will see an HTML version of the same screen available to the ECT. This web page will also conference them in to the audio video channel. In this way an EMT or Physician is able to access real time vitals from the PID, speak with them, and possibly see the PID while still en route. The proximal ECT member for example could use their cameras to provide this video feed once they arrive on scene.

DETAILED DESCRIPTION

Figure 1:
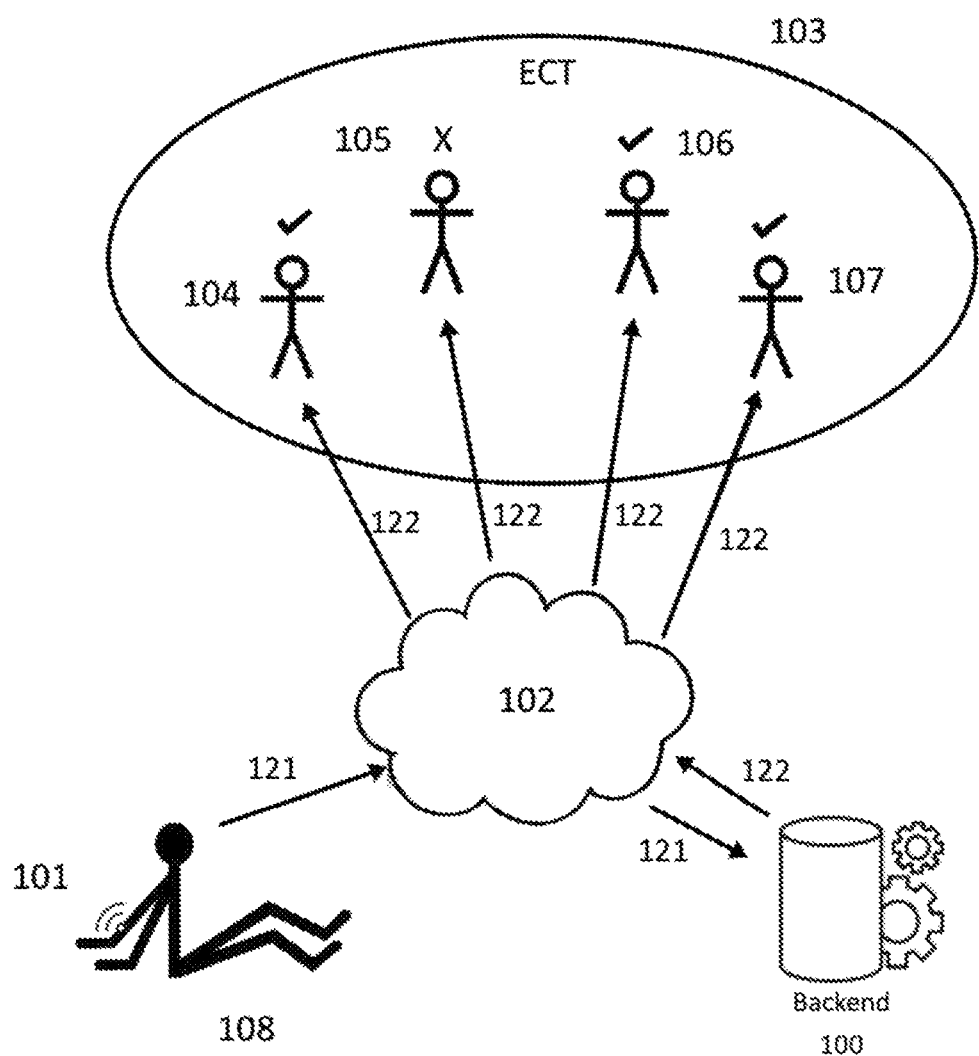
FIG. 1 shows the organization of the participants and their call status for the emergency call.

Referring to the drawing FIG. 1, The Person in Distress (PID) (108) is wearing a health monitor (101) and possesses an endpoint communication device such as but not limited to a mobile phone. A backend system (100) provides shared computing resources for all carees, an invited subset of their friends, family, and caregivers. The backend system (100) consists of at least one instance of a cloud hosted processing element, working memory, and nonvolatile memory with communications over a broadband network using IP based protocols. The caree has invited a subset of people from their friends, family, and caregivers to form an Emergency Care Team (ECT). One or more of these invitees have accepted the invitation. Each member of the ECT possesses an endpoint communication device such as but not limited to a mobile phone. Upon detection of an emergency event by the wearable health monitor (101), the monitor sends a message (121) across the communications network (102) to the backend system (100) indicating that an event appears to have occurred. Once confirmed, the backend system (100) notifies all members of the ECT (103) by sending a call request (122) across the communications network (102) to their endpoint communication devices. The response status of each member is tracked and relayed to all participants. In this example three ECT members (104, 106, and 107) have joined the call while one member (105) has not responded.

Figure 2:
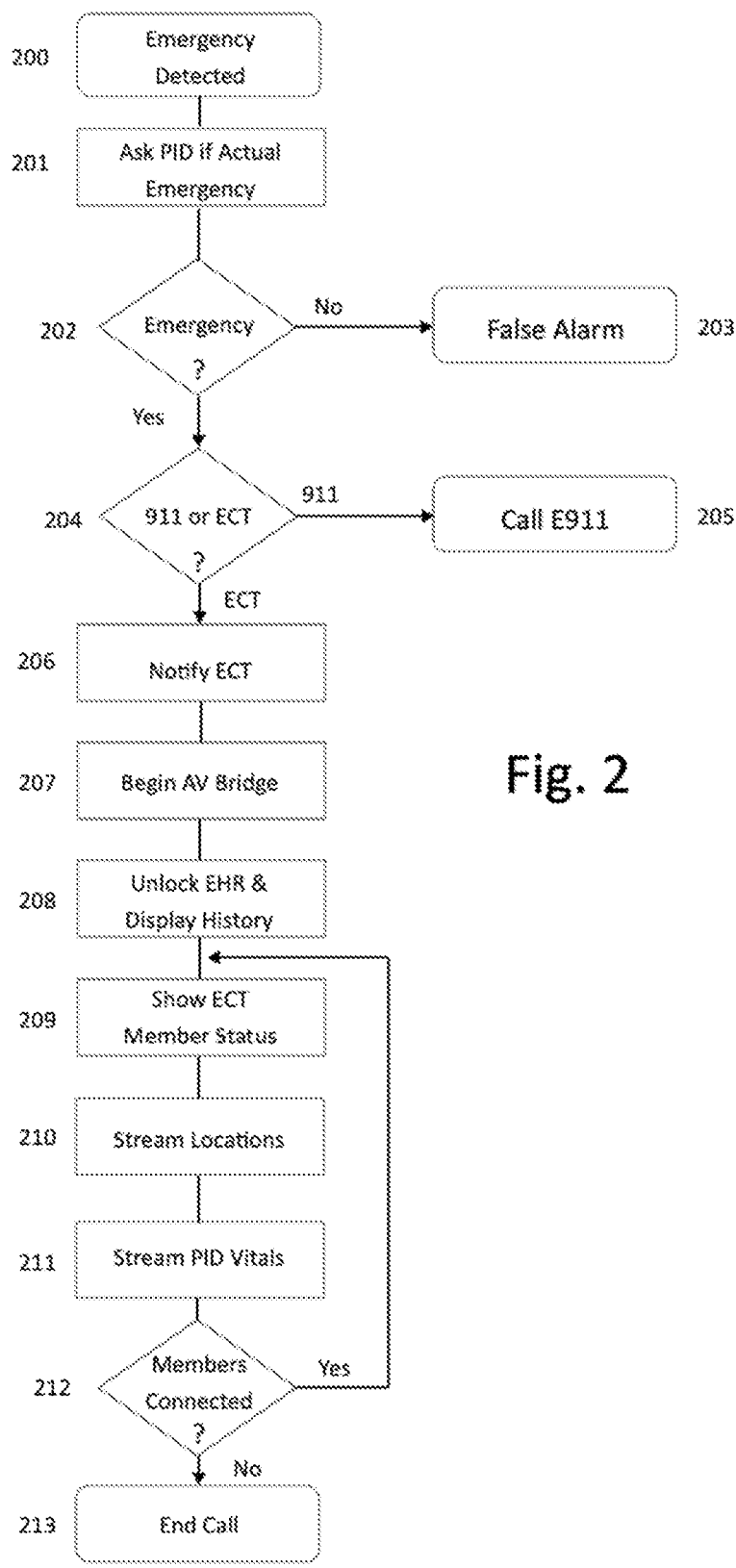
FIG. 2 shows the process for verifying and initiating an emergency call as well as keeping the call open until the response is complete.

FIG. 2 If an emergency is detected (200) the system will ask the person monitored if there is an actual emergency either through a graphical interface or voice (201). The user either responds or fails to respond in a fixed time period (202). If the user indicates a false alarm, the system will reset and no emergency call will be made (203). If the user affirms or if a timeout occurs, the system will present the option of calling E911 or initiating an ECT call (204). If the user proactively responds to call E911 a call will be placed on the PID's behalf (205). If the user opts for ECT or there is a timeout, the system will notify the ECT (206) and create a bridge for the conference (207). The system will unlock the Electronic Health Records (EHR) for the PID and display into the shared Graphical User Interface (208). The system will update the status of each ECT member to all (209), then update the geographic location of each member and the PID (210), and then update all vital signs the monitor is capable of reading (211). If the first member has not yet joined or if at least one member is still connected (212), the system will loop back to update the real time status information (209). If at least one member joined the call but subsequently all members disconnected (212) the system will end the call.

Figure 3:
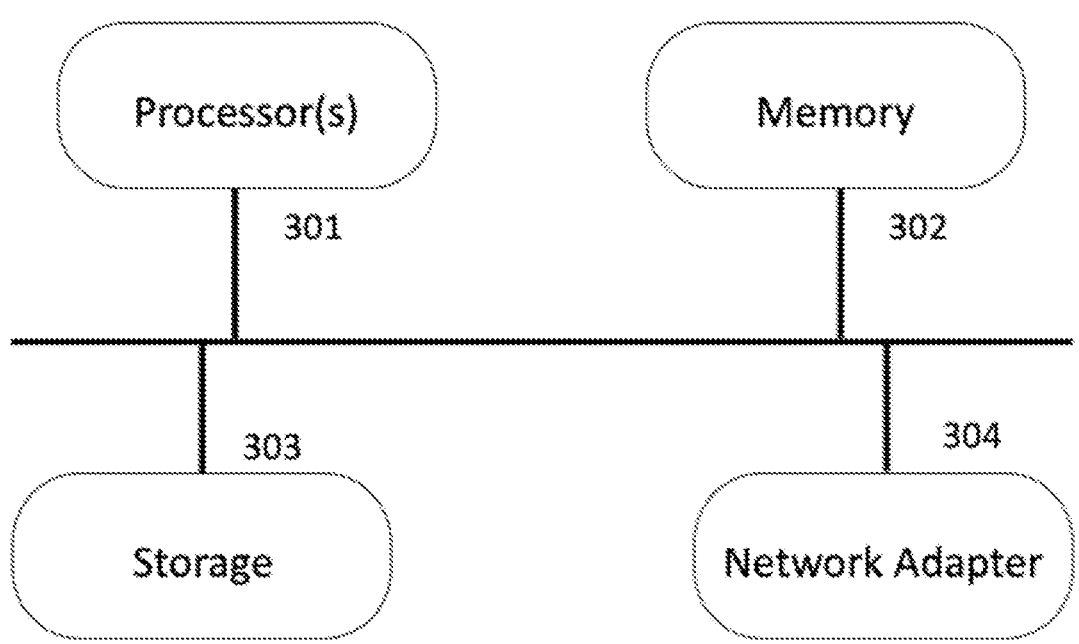
FIG. 3 shows the architecture of the backend system.

FIG. 3 shows the architecture of our backend system. At least one processing element (301) is connected to working memory (302) and storage or nonvolatile memory (303). The processing element is also connected to a Network Adaptor (304) which provides access to an internet for wide area communications.

What is claimed is:

1. A method for use in establishing a real time emergency collaboration team of individuals to assist in a medical emergency with a Person in Distress (PID) who is known to them comprising:

establishing a collection of Emergency Care Team (ECT) members who have accepted an invitation to join prior to the emergency event and who may or may not have medical power of attorney for the PID;

a PID confirming the emergency or failing to indicate a false alarm within a given time period;

sending a notification to all ECT members that an emergency is in progress;

joining the call by ECT members who are available to help those ECT members actively participating in the resolution of the issue by physically going to the location of the PID, speaking with the PID, or calling emergency medical technicians to respond to the emergency; and receiving audio, by each member of the ECT, from the endpoint device of all other ECT members, as well as receiving the real time location of the other ECT members and their call status viewing the relationship of each emergency call participant to the PID and the medical power of attorney status of each ECT member.

2. The method of claim 1, further comprising each member of the ECT receiving real time vital signs of the PID from that person's wearable monitor, the real time location of that PID, and a real time audio and video feed from the PID's endpoint device.

3. The method of claim 1, further comprising: viewing the recent vital signs history and the electronic health records of the PID.

4. A system for use in establishing a real time emergency collaboration team of individuals to assist in a medical emergency with a Person in Distress (PID) who is known to them comprising:

a medical monitoring device worn by a Person in Distress (PID) and the PID's endpoint communications device, both devices connected to each other through wireless short range transceivers;

a PID notification module configured to
confirm the emergency or failing to indicate a false alarm within a given time period;
send a notification to all ECT members that an emergency is in progress;

one or more endpoint communication devices associated with one or more ECT members, wherein the one or more endpoint communication devices are configured to:
enable joining the call by ECT members who are available to help those ECT members actively participating in the resolution of the issue by physically going to the location of the PID, speaking with the PID, or calling emergency medical technicians to respond to the emergency; and
receive audio, by each member of the ECT, from the endpoint device of all other ECT members, as well as receiving the real time location of the other ECT members and their call status viewing the relationship of each emergency call participant to the PID and the medical power of attorney status of each ECT member.

5. The system of claim 4, wherein the one or more endpoint communication devices are further configured to receive, by each member of the ECT, real time vital signs of the PID from that person's wearable monitor, the real time location of that PID, and a real time audio and video feed from the PID's endpoint device.

6. The system of claim 4, further comprising: wherein the one or more endpoint communication devices are further configured to view the recent vital signs history and the electronic health records of the PID.

* * * * *